United States Patent [19]
Forsdale

[11] 3,735,499
[45] May 29, 1973

[54] OPERATOR RESPONSE ANALYSIS MEANS AND METHOD

[76] Inventor: Joan Rosengren Forsdale, 38 Fourth Avenue, Nyack, N.Y. 10960

[22] Filed: Dec. 24, 1970

[21] Appl. No.: 101,335

Related U.S. Application Data

[63] Continuation-in-part of Ser. No. 737,094, June 14, 1968, abandoned.

[52] U.S. Cl. .................................................35/8 R
[51] Int. Cl. ..............................................G09b 3/02
[58] Field of Search.....................35/8 R, 9 R, 9 A, 35/26

[56] References Cited
UNITED STATES PATENTS

| | | | |
|---|---|---|---|
| 1,559,665 | 11/1925 | Beery et al. | 35/26 |
| 3,516,176 | 6/1970 | Cleary et al. | 35/9 A |
| 3,382,588 | 5/1968 | Serrell et al. | 35/9 A |
| 3,162,959 | 12/1964 | Wollman | 35/9 F |

Primary Examiner—Wm. H. Grieb
Attorney—Ostrolenk, Faber, Gerb & Soffen

[57] ABSTRACT

To determine how much information an operator receives before he responds to a stimulus, information is presented in a predetermined sequence. The information is programmed on an image source holding means, e.g. motion picture film. On each image is a response location, which is different for each image. The place where the operator responds shows how much information he received. The shifting response location also serves as a timing means for clocking the operator's response if the images are changed after predetermined intervals.

17 Claims, 3 Drawing Figures

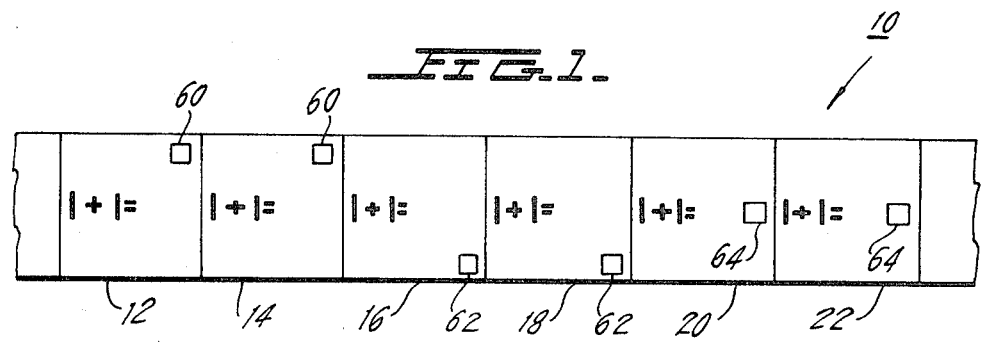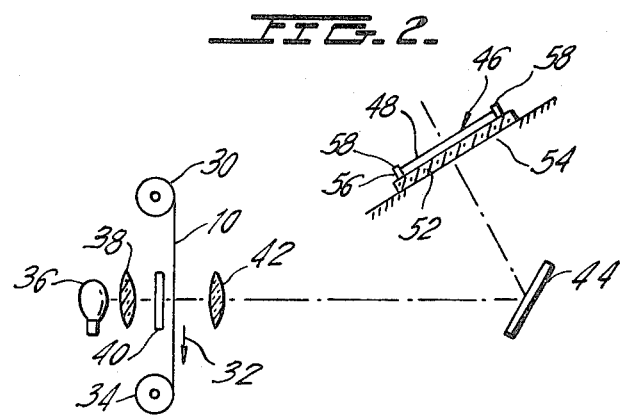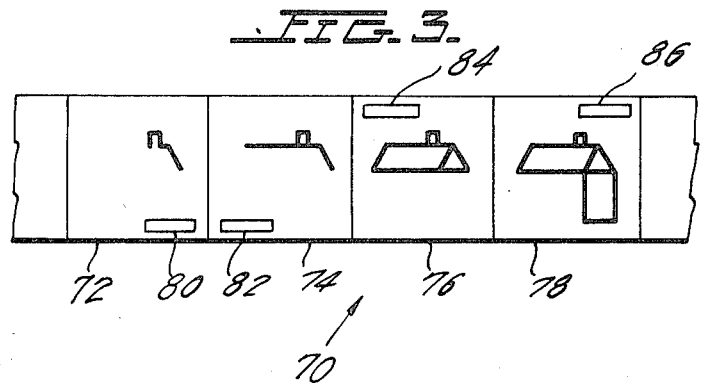

3,735,499

OPERATOR RESPONSE ANALYSIS MEANS AND METHOD

This is a continuation-in-part of application Ser. No. 737,094, filed June 14, 1968, now abandoned.

This invention relates to a means for and a method of determining what period of time elapses and/or how much information or instruction is required before an operator responds to a visual signal.

It is known to provide visual stimulus signals to an operator from image sources, e.g. photographs on a film strip. An operator makes some indication, e.g. he marks an object, in response to the signal. The signal may be visible upon or be viewed through an object upon which the operator is to make the indication. The location where the operator is expected to make his indication may be suggested by the viewed signal.

The present invention is directed toward a means for and a method of analyzing operator responses for determining the quantity of information, instructions or signals received by an operator before he responds to a stimulus or the amount of time that has elapsed from the time an operator views a stimulus to the time he responds to that stimulus. A plurality of image sources, such as photographic film frames, are provided. Each holds an image, which is capable of being viewed by an operator. Each image signals the operator to make a particular response. It is to be understood that the image may be supplemented by additional, and perhaps external, e.g. audible signals, a separate printed sheet, which provides additional signals or guidance to the operation. For example, the operator may be required to make a mark on an object, such as the screen, to which the images are transmitted. Each desired response is to be indicated at a different location on the object. Analysis of the location at which the operator made his indication will indicate to which signal from which image source the operator responded.

Where the image sources are arranged in a particular sequence, as they are when the image sources are individual frames of a strip of projectible photographic film, for example, the location at which the operator marked the object will provide information as to how many of the images were viewed by the operator before he responded. If each of the images in a series progressively provides additional information or instructions to the operator, the location of the mark will indicate how much information or instructions was received before the operator was able to respond.

If each of the images is rendered visible to the operator for only a predetermined period of time, as occurs in a motion picture film or in video tape, then the location at which the operator makes a mark will also provide information as to the time which elapsed before the operator made his response.

In a preferred embodiment of the invention, the images are transmitted to an object, e.g. a motion picture screen, television screen, or the like, upon which the operator is to make his indication, for example, a written mark. The image includes an instruction to the operator as to where to make the indication. For example, the location at which the operator is to make his indication may be surrounded by the viewed image of a box. In succeeding images in the series, the viewed response location shifts, whereby when the operator finally responds, the location of his indication or mark will indicate which images the operator has already viewed and is viewing.

After the program of images has ceased, if an analyzer wishes to determine either how much information or instruction was received or how much time elapsed before the operator made his indication, the location on the screen of the indication by the operator will provide this information.

The present invention has two important applications in education. First, it is useful in continuum testing. With a series of images that provide all operators, who view the images, with progressively more information until each operator has enough information to respond, every operator can eventually provide the correct response to the images. There will be degrees of correctness, i.e., a continuum of responses, but no operator will have a feeling of complete failure, i.e., of providing the wrong response.

Secondly, the invention is useful to prevent cheating. As time passes, the response location shifts. The images can be designed so that when the operator finally responds, he could not remember where previous response locations had appeared and, therefore, could not at a later time place his response at a location that had appeared earlier. Furthermore, the operator cannot write himself a reminder as to the location of a response, which had appeared earlier for the purpose of returning to that location later when he is able to respond. The images can be designed so that the earlier images purposely provide insufficient information for the operator to respond, whereby if the location of his response showed that he had responded to one of the earlier images, it would show that he had cheated.

Accordingly, it is a primary object of the present invention to provide a means for indicating how much information, instructions, or signals were received by an operator before he made a desired indication.

It is a further object of the present invention to determine how much time elapsed before the operator made his indication.

It is a further object of the present invention to provide both of such means through the medium of transmitted visible images.

It is another object of the present invention to permit realization of the foregoing objects without an analyzer having to observe or time the operator while the operator responds to the information, instructions or signals.

These and other objects of the present invention will become apparent from the following description of the accompanying drawings, in which:

FIG. 1 somewhat schematically illustrates a motion picture film strip having a plurality of images, which is designed to realize the objects of the present invention;

FIG. 2 schematically illustrates an apparatus employing the film strip of FIG. 1; and FIG. 3 schematically illustrates another film strip designed to realize the objects of the invention.

Turning to FIG. 1, strip 10 of conventional motion picture photographic film 10 comprises a plurality of frames 12, 14, 16, 18, 20 and 22. Each frame is an image source programmed with its own image.

Turning to FIG. 2, motion picture film strip 10 unwinds off reel 30, travels in the direction of arrow 32, and winds onto reel 34. The apparatus holding film strip 10 and reels 30, 34 is a conventional motion picture projecting apparatus or transmitting means, which includes at least the following components: light source 36, lens system 38 for directing the light from source 36 through film strip 10, shutter 40, film strip 10 and focusing lens system 42. Shutter 40 operates in coordination with the movement of film strip 10 to allow light to shine through the film strip only when each frame 12–22 of the film strip is properly positioned for projection of each image. While film strip 10 is shown as having a beginning and an end, it may be readily made in the form of a continuous loop.

In a particular embodiment of the invention, the projected image is reflected off redirecting means 44 to screen means 46, which is the object upon which the image is seen and upon which the operator makes his indication or mark. Screen means 46 includes a thin, flexible mark receiving sheet 48 of paper, which is removable from the apparatus supporting it.

The focal point of lens system 38 is so adjusted that the image is visible at screen 48.

To support sheet 48, a light permeable rigid support medium 52 is provided beneath it. Medium 52 may be transparent or translucent, but must be sufficiently clear so that it does not appreciably diffuse or absorb the image projected by the projecting apparatus, e.g., a glass or plastics material. Sheet 48 is removably positionable upon support medium 52 by screen mounting and alignment pegs 58, which predictably position the sheet so that the location of a mark on the sheet will indicate the location of the operator's response.

After one operator has responded to film strip 10, his sheet 48 can be removed from support 52, which completely removes the record of that operator's responses from the apparatus. A sheet for another operator can be placed on the apparatus, whereby the apparatus may be readily reused. The used screens provide records of the responses of each operator to the images in film 10.

A specimen series of images arranged in a particular order is shown in FIG. 1. All of the images are stimuli to cause the operator to respond to the problem presented. In a conventional motion picture apparatus, each image on each frame of the motion picture is projected for a predetermined period of time. Each of the images includes response space 60, which is visible on screen 48. The operator is expected to provide his solution to the problem in the response space that he views on the screen. After a predetermind period of time, which is determined by the rate at which film strip 10 moves, the visible image on frame 12 disappears from sheet 48 and that on frame 14 appears. After a further identical period of time, the image on frame 16 appears. The visible images continue to appear in sequence.

If the operator responds on sheet 48 in the response space 60 that has been supplied by the images on frames 12 or 14, it is an indication that the operator answered the question during a first time interval. If the operator's response is at a location corresponding to the location of response space 62 appearing in frames 16 and 18, it is an indication that the operator required an additional period of time to respond. Finally, if the response is at the location corresponding to response spaces 64 in frames 20, 22, it is an indication that the operator required a still further period of time to respond.

Analysis of the location at which the operator responded will provide information as to the number of frames of film that were shown before the operator responded. Since the images on the film strip change at a known rate, the number of frames of the film that are shown before the operator responds are an indication of the amount of time required by the operator to solve the problem, or at least, to indicate his solution.

FIG. 3 shows a different type of film strip 70, which permits the determination of how much information or instruction is received by an operator before he makes his indication or marking. Film 70 comprises frames 72, 74, 76, 78, each of which is programmed with a different image source having a slightly different image thereon. Each image includes a respective response space 80, 82, 84, 86 which, when projected on a screen, serves as the location at which the operator is expected to provide his response.

Film strip 70 is comprised of a series of images arranged in a predetermined sequence on a film strip. Each frame in the sequence must be viewed only after the preceding frame has been viewed. The images can be changed, either under the control of an automatic means, as in the case of a motion picture film, or by manually controllable means.

The operator first views the image on frame 72 and is asked to described the object shown in the image. The description by the operator should appear at the location on the screen corresponding to the viewed image of response space 80. If the operator has not received sufficient information from frame 72, he next views the image on frame 74. If this provides sufficient information, the operator marks the description in response space 82 of frame 74. Note that response space 82 is in a different location than response space 80 of frame 72. A description at space 82 rather than space 80 will indicate to one analyzing the operator's markings that the operator wrote the description after he received the information on frame 74.

Similarly, if the operator feels that the information contained in the image on frame 74 is insufficient, he next observes frame 76 and marks his response in response space 84. Finally, if frame 76 provides insufficient information, the operator views frame 78 and responds in response space 86. Note that spaces 84, 86 are in different locations on the viewed image than one another and than spaces 80, 82. Thus, by the location of the operator's response on the screen, the amount of information the operator received before he responded can be ascertained.

A simple alternate form of the above technique would not require the use of response spaces. Frame 72 would hold the same image of part of an object it now holds, but would not have any response space. The operator would be required to complete on his screen the image transmitted to the screen from frame 72. Should the portion of the object illustrated by the image on frame 72 provide insufficient information to the operator, he would view frame 74 and complete the image projected on his screen from that frame. If the image on frame 74 did not provide sufficient information, the operator would view frame 76; and if that were insufficient, frame 78, until he could correctly complete the image on his screen.

By studying the markings made by the operator in completing the image he viewed, an analyzer of the operator's markings could determine how much information the operator received before marking his screen.

The present invention is useful for determining either how much information or instructions an operator receives before providing a response or for determining how much time an operator uses to provide a response, or both as would be the case if the film strip 70 of FIG. 3 were moved at a predetermined rate so that the images on frames 72–78 were viewable for only a predetermined period.

There can be modifications and variations in the type of image source which may be used, the type of transmitting means which may be used with the image source, the type of object upon which the operator responds, and whether the image will be transmitted to the surface of the object upon which the operator responds or to a different surface.

Although the invention has been described above with respect to a number of its preferred embodiments, it will be understood that many variations and modifications will be obvious to those skilled in the art. It is preferred, therefore, that the scope of the invention be limited not by the specific disclosure herein, but only by the appended claims.

I claim:

1. A plurality of separate image sources, each holding a means for producing an image capable of being viewed; said image sources being arranged in a preselected sequence;
   each said image comprising a different signal for instructing an operator to make an indication at a different particular location on an object,
   means for presenting each image in said sequence and for a predetermined period of time that is unrelated to whether the operator makes any indication; whereby analysis of the particular location at which the indication was made will indicate to which signal the operator responded in making the indication and how many images were viewed before the indication was made.

2. The plurality of image sources of claim 1, wherein said images include information with respect to which the operator is to make an indication and include a signal instructing the operator where to make the indication on the object; said information on a group of successive said images changes at one predetermined rate in said group of successive said images while said instructions as to where to make the indication change at a second predetermined rate in the same said group of successive said images.

3. The plurality of separate image sources of claim 1, wherein said image sources are programmed on a single strip of image sources.

4. In combination, the plurality of separate image sources of claim 1, and means for transmitting each image, in turn, from its respective said image source to the object.

5. The combination of claim 4, wherein the plurality of image sources are arranged in a strip of projectible photographic film, the image on each individual frame of which is, in turn, transmitted to a screen means that serves as the object.

6. The combination of claim 5, wherein each signal transmitted to the screen means from each image source provides an instruction to the operator to make an indication at the particular location on the screen means.

7. The plurality of separate image sources of claim 1, wherein said images include information with respect to which the operator is to make an indication and include a signal instructing the operator where to make the indication on the object; said information on a group of successive said images remains the same while said instructions as to where to make the indication change in the same said group of successive images.

8. A combination, comprised of the plurality of separate image sources of claim 7, wherein said image sources are arranged in a strip of projectible photographic film; and
   means for transmitting each said image, in turn, to a screen means that serves as said object,
   said signal instructing the operator where to make the indication provides an instruction to the operator to make an indication at the particular location on said screen means.

9. The combination of claim 8, wherein said indication comprises making a mark on said screen means, and said screen means being adapted to receive a mark; each said image including a signal as to where to make a mark on said screen means.

10. A method for determining the amount of information required by an operator to provide a desired response to a stimulus, comprising
    providing a plurality of images, each including additional information which better enables an operator to respond to a particular stimulus;
    arranging the images in a predetermined sequence such that each succeeding image provides more of the information than the preceding image;
    including in each image an instruction means to the operator as to where on an object the operator should indicate his response to the stimulus, wherein each indication location instruction for each image is different;
    presenting each of the images to the operator in the sequence;
    analyzing the location of the indication by the operator on the object to determine how many images the operator viewed and how much information the operator received before making his response.

11. A method for determining the length of time required by an operator to provide a desired response to a stimulus, comprising
    providing a plurality of images, each providing a stimulus seeking a response from an operator;
    arranging the images in a predetermined sequence;
    including in each image an instruction means to the operator as to where on an object the operator should indicate his response to the stimulus, wherein each indication location instruction for each image is different;
    presenting each of the images to the operator in the sequence for a predetermined period;
    analyzing the location of the indication by the operator on the object to determine how many images were presented to the operator before he made his response.

12. The method for determining the amount of information required by an operator of claim 11, wherein each succeeding image of the plurality of images includes additional information which better enables an operator to respond to a particular stimulus.

13. A plurality of separate image souces, each holding a means for producing an image capable of being viewed; said image sources being arranged in a preselected sequence;
    means for presenting each image in said sequence and for a predetermined period of time that is unrelated to whether the operator makes any indication;

each said image comprising a different signal for instructing an operator to make an indication at a different particular location on an object;

said images include information with respect to which the operator is to make an indication and include a signal instructing the operator where to make the indication on the object; said information on a group of successive said images is different for each image, but is in a continuum of information and all said images in said group are interrelated in said continuum; said instructions as to where to make the indication change at a predetermined rate in said group of successive said images.

14. A plurality of separate image sources, each holding a means for producing an image capable of being viewed; said image sources being arranged in a preselected sequence; means for presenting each image in said sequence;

each image includes information with respect to which the operator is to make an indication and includes a different signal for instructing an operator to make an indication at a different particular location on an object;

each successive said image in a group of said images includes an increment of information more than the previous said image in said group, while said instructions as to where to make the indication change in the same said group of successive said images, thereby providing indication as to after which increments of information an indication was made.

15. A combination, comprised of the plurality of separate image sources of claim 14, wherein said image sources are arranged in a strip of projectible photographic film; and means for transmitting each said image, in turn, to a screen means that serves as said object, said signal instructing the operator where to make the indication provides an instruction to the operator to make an indication at the particular location on said screen means.

16. The combination of claim 15, wherein said indication comprises making a mark on said screen means, and said screen means being adapted to receive a mark; each said image including a signal as to where to make a mark on said screen means.

17. A method for determining the amount of information required by an operator to provide a desired response to a stimulus, comprising:

providing a plurality of different images, but each being interrelated in a continuum of information;

arranging the images in a predetermined sequence such that the continuum of information changes in accordance with a predetermined sequence;

including in each image an instruction to the operator as to where on an object the operator should indicate a response to the stimulus incorporated in the sequence of images, wherein each indication location instruction for each image in the continuum is different;

presenting each of the images to the operator in the sequence;

analyzing the location of the indication by the operator on the object to determine how many images the operator viewed and after which point in the continuum of information received by the operator, the operator made his response to the stimulus.

* * * * *